United States Patent
Hammons et al.

(10) Patent No.: US 7,254,840 B2
(45) Date of Patent: Aug. 14, 2007

(54) IMPACT AND/OR VIBRATION ABSORBENT MATERIAL AND PROTECTIVE GLOVE MAKING USE THEREOF

(75) Inventors: Gary Hammons, Richwood, OH (US); Roger W. Kramer, Springfield, OH (US); Charles Marks, Springfield, OH (US); Kevin Porter, Marysville, OH (US); Robert Bogard, Columbus, OH (US); Traci Skahill, Hilliard, OH (US); Mark Smith, Marion, OH (US)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 11/084,906

(22) Filed: Mar. 21, 2005

(65) Prior Publication Data

US 2006/0206980 A1    Sep. 21, 2006

(51) Int. Cl.
*A41D 19/00* (2006.01)
(52) U.S. Cl. .................................. 2/16; 2/161.6
(58) Field of Classification Search .......... 2/16, 2/20, 21, 161.1; 428/137, 217, 316.6
See application file for complete search history.

(56) References Cited

U.S. PATENT DOCUMENTS

| | | | |
|---|---|---|---|
| 4,042,975 A | 8/1977 | Elliott, Jr. et al. | |
| 4,471,538 A | 9/1984 | Pomeranz et al. | |
| 4,570,269 A | 2/1986 | Berlese | |
| 4,825,565 A | 5/1989 | Bigolin | |
| 5,632,045 A * | 5/1997 | Chase et al. | 2/161.6 |
| 5,640,712 A | 6/1997 | Hansen et al. | |
| 5,673,437 A | 10/1997 | Chase et al. | |
| 5,753,061 A | 5/1998 | Rudy | |
| 5,830,553 A | 11/1998 | Huang | |
| 5,840,397 A * | 11/1998 | Landi et al. | 428/73 |
| 5,898,938 A | 5/1999 | Baylor et al. | |
| 5,916,664 A | 6/1999 | Rudy | |
| 6,275,996 B1 | 8/2001 | Redwood et al. | |
| 6,319,599 B1 | 11/2001 | Buckley | |
| 6,341,376 B1 | 1/2002 | Smerdon, Jr. | |
| 6,374,514 B1 | 4/2002 | Swigart | |
| 6,402,879 B1 | 6/2002 | Tawney et al. | |
| 6,405,456 B1 | 6/2002 | Nichelson | |
| 6,571,490 B2 | 6/2003 | Tawney et al. | |
| 6,701,529 B1 | 3/2004 | Rhoades et al. | |
| 6,723,401 B1 * | 4/2004 | McKnight et al. | 428/35.7 |
| 7,171,696 B2 * | 2/2007 | Falone et al. | 2/161.1 |
| 7,171,697 B2 * | 2/2007 | Vito et al. | 2/161.1 |
| 2004/0020079 A1 | 2/2004 | Klavano | |
| 2004/0191446 A1 | 9/2004 | Kriesel | |
| 2004/0194344 A1 | 10/2004 | Tadin | |
| 2006/0206977 A1* | 9/2006 | Hammons et al. | 2/16 |
| 2006/0280906 A1* | 12/2006 | Trentacosta et al. | 428/137 |

* cited by examiner

*Primary Examiner*—Katherine Moran
(74) *Attorney, Agent, or Firm*—Standley Law Group LLP

(57) ABSTRACT

An impact and/or vibration absorbent material and articles, particularly a protective glove, making use of said material. An impact and/or vibration absorbent material of the present invention has at least two material layers. The individual layers of the impact and/or vibration absorbent material may be of the same material, or of different materials. Each material layer preferably contains a number of holes. The holes in one layer are located and arranged to be offset from the holes in an adjacent layer. The combination of inherent material properties and the inclusion and arrangement of holes renders such a material highly impact and/or vibration absorbent. When used in an impacting article, deflection of portions of one material layer into the holes in an adjacent material layer at impact further provides an enhanced transfer of impact force to an impacted object.

29 Claims, 7 Drawing Sheets

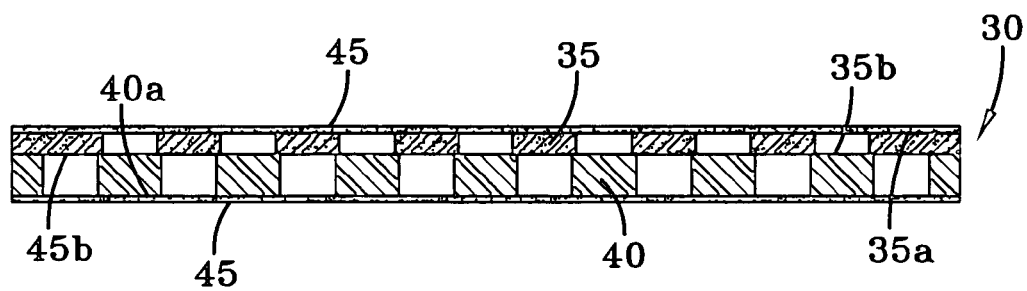
FIG-3
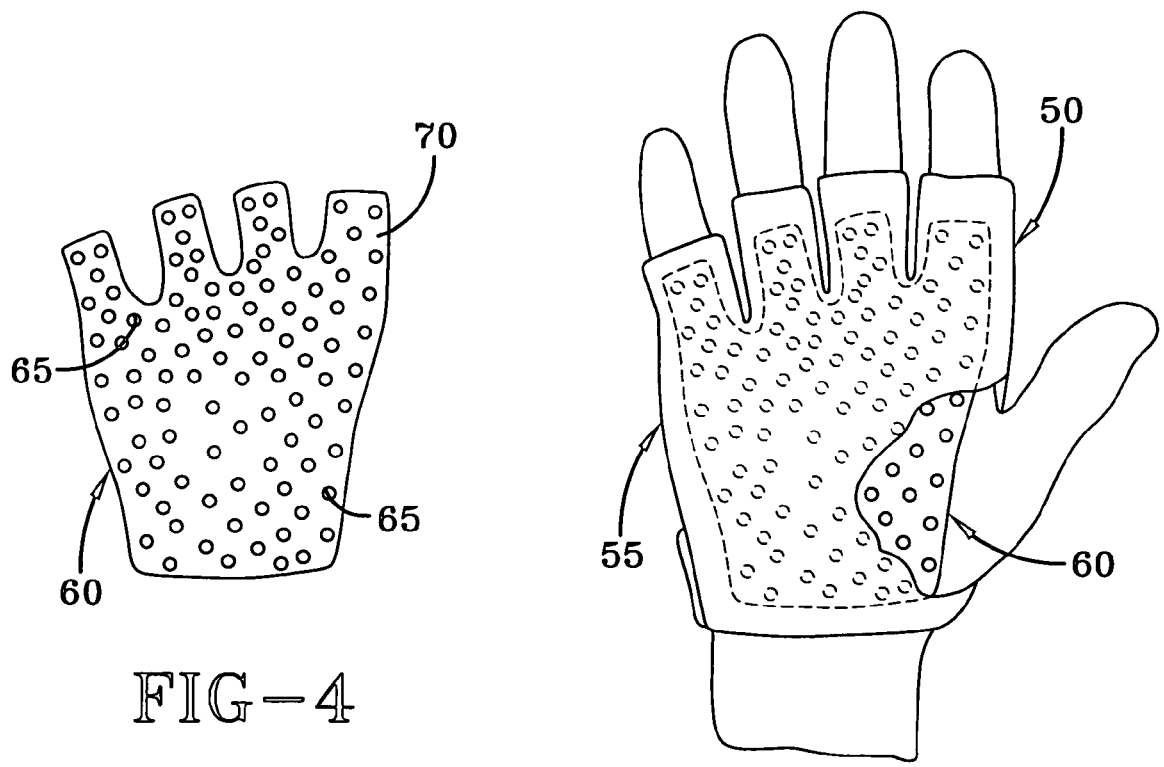
FIG-4
FIG-5

IMPACT AND/OR VIBRATION ABSORBENT MATERIAL AND PROTECTIVE GLOVE MAKING USE THEREOF

BACKGROUND OF THE INVENTION

The present invention is directed to an impact and/or vibration absorbent material and to a protective impact glove that incorporates said material. A testing apparatus that is particularly well-suited for determining the impact force absorption characteristics of such a material is also disclosed.

Exposure of the human body to repeated impact and/or vibration is a known problem. Such exposure can occur in various settings: both occupational and recreational.

It is known, for example, that extended exposure of the human body to vibration can lead to vascular, neurological and musculoskeletal disorders. The source of such vibration is commonly some type of mechanical device, such as a hand-held vibrating tool. In the case of exposure to hand-held vibrating tools, resultant disorders typically manifest in the body's upper limbs—such as in the form of carpal tunnel syndrome, for example.

Similar problems may also result from repeatedly impacting an object with the hand. There are many situations, particularly occupational situations, where a person's hand is effectively used as a tool to impact another object. For example, in certain automotive manufacturing operations, the hand can frequently be used to install fasteners or to set the position of one assembly component to another. In such a situation, it is desirable to transmit as much of the hand-generated impact force as possible to the impacted object, while simultaneously protecting the hand from impact related injuries.

Also problematic is what may be referred to as whole-body vibration, such as may be transmitted through the seat of an industrial vehicle. A multiplicity of vehicles may transmit such vibration: from large outdoor earth-moving equipment to commonly used forklifts and tow motors, for example. Rather than causing a problem with a particular limb or limbs, however, whole body vibration commonly results in spinal system disorders.

The human body, or particular portions thereof, may also be exposed to undesirable impact and/or vibration in a recreational setting. For example, it is known that long term participation in certain racquet sports may lead to similar problems. Interestingly, it has also been found that such problems may plague cyclists due to the persistent pressure put on the nerves of the hand by the handlebars of a bicycle (or motorcycle), as well as the transmission of shock and vibration therethrough. Certainly, a person's shoes can also transmit shock and/or vibration to the feet during walking, running, hiking, climbing, or other activities.

Various types of protective equipment have been produced in an effort to combat the aforementioned problems. Of particular interest are gloves that have been designed to reduce the amount of impact and/or vibration force transmitted to the hand when using devices such as hand-held power (vibrating) tools, or when using the hand as an impact tool. Other articles have also been developed in this pursuit, including, for example, shoe soles and shoe inserts. These articles may make use of different material compositions, multiple air bladders, and/or various other designs and techniques to achieve a reduction in impact and/or vibration transmission.

However, Applicants have discovered that, at least with respect to hand protection, each of the known products still transmits a significant amount of impact and/or vibration to the wearer's hand. Consequently, any improvement in impact and/or vibration absorbent hand protection is highly desirable. An impact and/or vibration absorbent material of the present invention and a protective impact glove made therefrom can provide such improvements.

SUMMARY OF THE INVENTION

The present invention is directed to an impact and/or vibration absorbent material that can be used in a variety of protective equipment and apparel (articles)—particularly gloves. Although an impact and/or vibration absorbent material of the present invention is particularly well-suited for use in protective gloves, it should also be realized that said material may also find use in many other articles such as, for example, shoe soles, shoe insoles, seat cushions, head rests, and a variety of other body protective devices and apparel. It should be further understood that the term "protective article," as used herein, refers not only to articles specifically designed to reduce or eliminate impact and/or vibration induced injuries, but also to articles that simply make exposure to such forces more comfortable.

An impact and/or vibration absorbent material of the present invention is preferably comprised of a layered composition of one or more materials. For example, one such two layer material includes a first (inner) layer of a flexible polymeric material in abutment with a second (outer) layer of a closed-cell foam material. Other material combinations may be used in other embodiments, however, it is preferred that the material forming the inner layer have a hardness greater than that of the material forming the outer layer.

No matter the particular materials used to form the impact and/or vibration absorbent material, however, a plurality of holes are provided in at least certain ones of and, preferably, all the layers thereof. For example, in the polymer/closed-cell foam composition mentioned above, each layer of material is provided with a plurality of holes. The size, shape and number of holes may vary. However, the holes are preferably located in each layer so that when the layers are properly assembled, the holes in one layer will be offset from the holes in the other layer. When more than two layers of material are used, each layer is provided with holes that are offset with respect to the layer(s) adjacent thereto. Preferably, the holes are thru-holes that extend completely through each respective material.

It has been discovered that this use and arrangement of holes improves the ability of a material of the present invention to absorb impact and/or vibration. It has also been determined that through the proper selection of materials and the use of the offset thru-holes, the amount of impact force transferred to an object by a protective glove-covered hand can be significantly increased without increasing the amount of impact force imparted to the hand.

The impact and/or vibration absorption abilities of a material of the present invention are believed to be improved in part by the offset hole pattern—which allows for increased material deflection. More specifically, when a material of the present invention is subjected to an impact and/or vibration force, the presence of the holes and their offset arrangement provides an additional dimension (direction) of deflection for the material surrounding the area of impact. For example, when a two layer material of the present invention is subjected to an impact and/or vibration force, the force can be absorbed/dissipated not only by a general deformation of one or both materials and a deflection of portions of one both materials into holes located respectively therein, but also by deflection of the inner layer of material into holes in the adjacent outer layer. The offset hole pattern increases the open surface area into which the material(s) can be deflected—thereby allowing for increased absorption properties.

A material of the present invention has also been shown to impart an additional benefit when the material is employed with an article, such as a protective impact glove, that is used by a wearer to deliver an impact force to another object. More specifically, as will be described in more detail below, the ability of an inner layer of material to deflect into holes in an outer layer of material permits more of the impact force generated by the hand to be delivered to the object; without increasing (or actually decreasing) the amount of impact force experienced by the hand.

In contrast, known impact absorbent materials lack the ability to dissipate and absorb forces in this manner. Even if such materials are provided with collapsible cavities, for example, they lack the ability of a material of the present invention to also deflect into holes residing in an adjacent material layer(s) when subjected to an impact and/or vibration force. Rather, known materials are required to dissipate impact and/or vibration forces purely through the expansion/deformation of the solid material, or through transverse-only deflection of the material into cavities, if such are provided. Therefore, these known materials are also incapable of increasing the impact force transfer rate when used in an item such as a protective impact glove. Consequently, as can be understood from the foregoing description, an impact and/or vibration absorbent material of the present invention, and various articles making use thereof, can provide for impact and/or vibration protection/transfer that is superior to that of known materials and articles made therewith.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 3 depicts an alternate embodiment of a material composition of the present invention, wherein an exposed major surface of each material layer shown in FIG. 2 is covered with a stretchable fabric;

FIG. 4 is a top plan view of an exemplary impact and/or vibration absorbent glove insert of the present invention;

FIG. 5 depicts, in partial cut-away, the glove insert of FIG. 4 being used in one embodiment of a protective impact glove of the present invention;

DETAILED DESCRIPTION OF THE EXEMPLARY EMBODIMENT(S)

Figure 1:
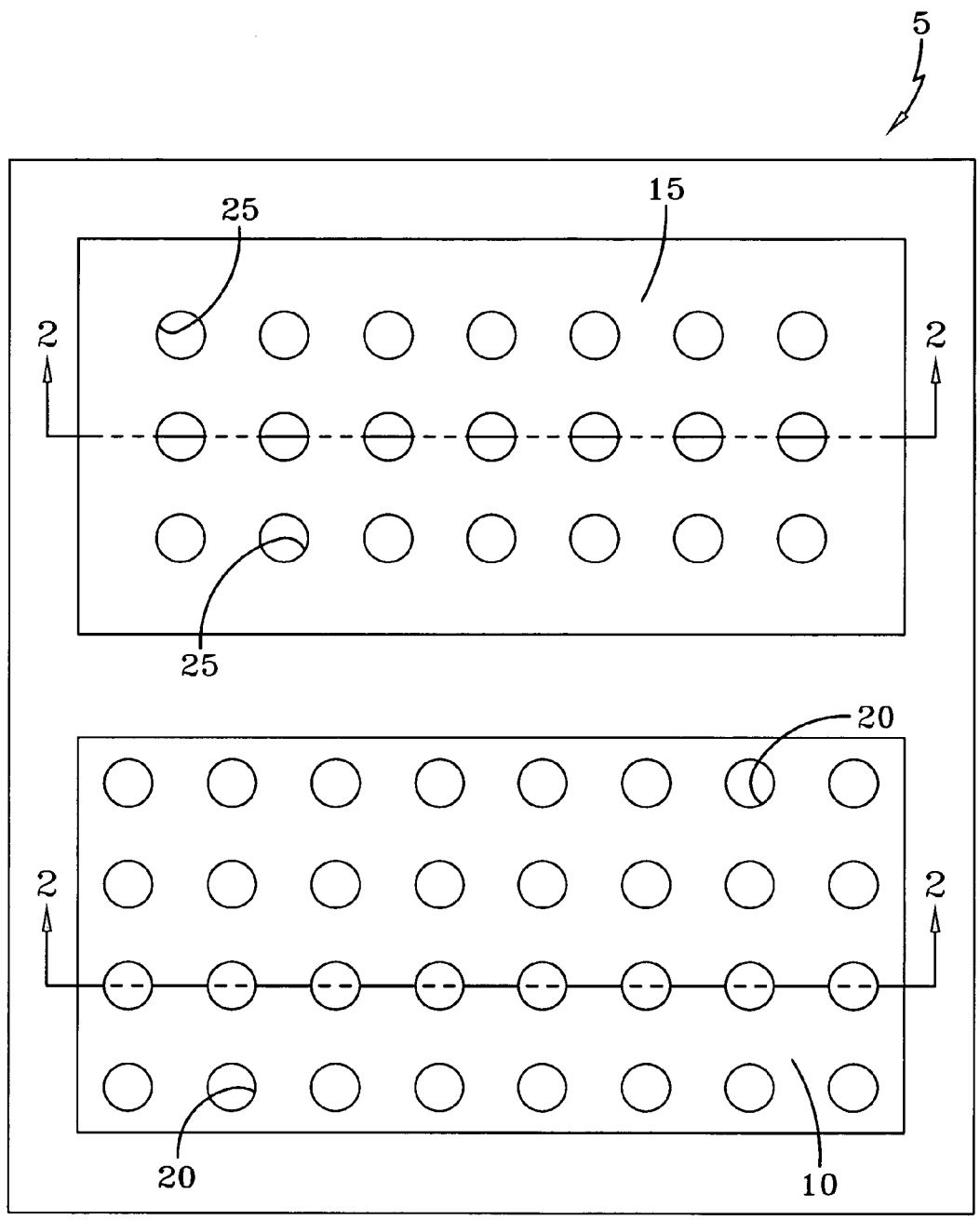
FIG. 1 shows a top plan view of each of two separate material layers that will be placed in contact to form an exemplary impact and/or vibration absorbent material of the present invention.
Figure 2:
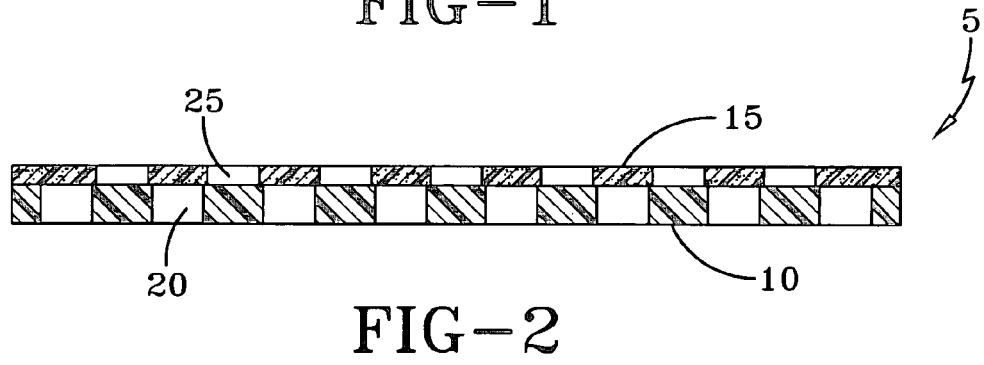
FIG. 2 is a side elevational view, in cross-section, showing the material layers of FIG. 1 after being assembled.

One embodiment of an impact and/or vibration absorbent material 5 of the present invention can be observed by reference to FIGS. 1-2. As can be seen in FIG. 1, two separate material layers 10, 15 are included in this particular material. The first (inner) layer 10 may be constructed from a number of flexible materials, such as polymeric materials and polymeric gel materials. Suitable materials may comprise, without limitation, silicone, urethane, and various other elastomers and thermoplastic elastomers. In this particular embodiment, the inner layer 10 of the impact and/or vibration absorbent material 5 is manufactured from a polymeric gel. Such a gel may be comprised of a block copolymer material, such as one of the family of block copolymer materials available from Kraton Polymers under the tradename of Kraton®. Of course, a number of other suitable materials are also available, and such would be known to those skilled in the art. Such materials are considered well-suited to use in the present invention due to, among other things, their flexibility, softness, deformability, and impact and/or vibration absorbent properties. Whatever particular material is selected for the inner layer, however, it is preferred that such material exhibit a minimal propensity to stick to itself.

The second (outer) layer 15 may also be constructed from a number of different materials. For example, it has been found that closed-cell foam materials such as, for example, Neoprene® perform very well when used to construct the outer layer 15. A number of other rubber, plastic and/or polymeric materials may also be used to construct the outer layer 15. In any event, it is preferred that the material of the outer layer 15 have a hardness that is greater than the hardness of the material of the inner layer 10 (for reasons described in more detail below). While many harder materials (e.g., PVC) may be used to form the outer layer 15, it has been found that the use of a somewhat more flexible closed-cell foam material, such as Neoprene®, allows the outer layer 15 to contribute to the overall impact and/or vibration absorbing characteristics of the material to a greater extent than would be possible with a considerably harder material.

As shown, each of the first layer 10 and the second layer 15 is provided with a plurality of holes 20, 25. Preferably, as can be best observed by reference to FIG. 2, the holes 20, 25 pass fully through each material layer 10, 15.

The holes 20, 25 may be of virtually any size and shape. The size and shape of the holes 20, 25 may be altered as necessary to produce the desired amount of impact and/or vibration resistance. As with hole size and shape, the number of holes 20, 25 provided may also vary according to the particular application.

As can be seen in FIGS. 1-2, the holes 20, 25 are preferably located such that the holes in one layer 10 will be offset from the holes in the other layer 15 after the two layers have been properly assembled to one another. In this particular example, the offset of the holes 20, 25 is shown to be such that a row of holes in one layer lies substantially equidistant between corresponding rows of holes in the other layer. However, while preferable, such an arrangement is not considered essential to the functioning of the present invention. For example, a row of holes in one layer may be biased toward a row of holes in an adjacent layer, rather than residing substantially in the middle of the space therebetween. The holes in each layer may even be located such that there is a slight overlap of at least some of the holes after the layers are assembled.

Although the holes 20, 25 are shown in FIG. 1 to be arranged in substantially equidistant rows, this too is optional. The holes 20, 25 in FIG. 1 are shown in this manner purely for simplicity of illustration, and because the exemplary material layers 10, 15 are shown to be of random size and shape. When an impact and/or vibration absorbent material composition of the present invention is to be used in a specific application, such as in a protective impact glove, both the size and shape of the material layers, and the size, shape, number and arrangement of the holes may be altered as desired.

An alternate embodiment of an impact and/or vibration absorbent material 30 of the present invention is illustrated in FIG. 3. This embodiment of the impact and/or vibration absorbent material 30 is similar to the material of FIG. 2, however, in this particular embodiment a thin layer of a stretchable fabric 45 covers one or both of the exposed major surfaces 35a, 40a of the inner and outer layers 35, 40. The stretchable fabric 45 can facilitate installation of an impact and/or vibration absorbent material of the present invention into a protective article such as, for example, a glove. The stretchable fabric 45 is selected such that it does not impede the ability of either material layer 35, 40 to deform and/or otherwise absorb impact and/or vibration. Acceptable stretchable fabrics may include, without limitation, various stretchable nylon and Neoprene® fabrics, as well as spandex-type materials such as Lycra®. Numerous other stretchable fabrics may also be used in this manner. When such a material is used in the present invention, the holes in the impact and/or vibration absorbent material layers may pass through the fabric (as shown in FIG. 3) or, alternatively, the fabric may span the holes. In a modification of this embodiment (not shown), such a fabric may also cover the abutting major surfaces 35b, 45b of each layer 35, 40.

One embodiment of a protective impact glove 50 that incorporates an impact and/or vibration absorbent material of the present invention is shown in FIG. 5. This particular protective glove 50 is designed to expose a portion of each of the four fingers of the hand H, and offers no protection for the thumb. However, this glove 50 is provided for the purpose of illustration only, and in no way limits the scope of the present invention to such a design. As one skilled in the art would readily understand, there are a multitude of glove designs that would fall within the scope of the present invention. As such, a protective impact glove of the present invention may be fingered or fingerless, and may have a body portion (shell) constructed from a wide variety of materials including, for example, leather, vinyl, fabric, various composites, and/or virtually any other material from which gloves are currently manufactured or may be manufactured in the future.

An impact and/or vibration absorbent insert 60 according to the present invention is shown to be installed within the glove 50 in FIG. 5, and can be seen in its entirety by reference to FIG. 4. The insert 60 may be constructed from an impact and/or vibration absorbent material 70 that is the same or similar to the material shown in FIGS. 1-3, for example. Alternatively, the insert 60 may be constructed from another impact and/or vibration absorbent material in accordance with the present invention that is not specifically shown in the drawing figures.

As can be observed in FIG. 4, this particular impact and/or vibration absorbent insert 60 is shaped for installation to a body portion (shell) 55 of the protective glove 50 depicted in FIG. 5 and, therefore, also covers only a portion of the hand H. Of course, as can be understood, such an insert could also be of various other size and shape to conform to the particular glove body with which it will be used.

In an insert 60 like that shown in FIGS. 4-5, the holes 65 in the impact and/or vibration absorbent material 70 may be provided in the offset pattern described previously, and distributed substantially uniformly throughout the material. Alternatively, it is possible to distribute the holes 65 in a non-uniform manner. For example, certain areas of the insert 60 may contain holes of different size and/or a greater or lesser concentration of holes in order to alter the amount of impact and/or vibration protection provided to corresponding areas of the hand H. It may also be desirable, and is possible, to design and construct certain areas of the insert 60 with no holes.

Although the insert 60 of FIGS. 4-5 is shown to be of one piece construction, it should also be realized that such an insert may be comprised of multiple components. For example, an insert (not shown) may include a palm protecting portion, as well as separate finger protecting portions. This may be especially useful when applied to a fingered glove. Further, although the glove 50 of FIG. 5 is only shown to include an insert 60 on its palm side, an insert could also be provided on the opposite side to protect the back portion of the hand H.

Each insert(s), or insert portion, may be permanently affixed to the glove 50, such as by sewing, bonding, or any other method that would be known to one skilled in the art. Additionally, certain of the materials useable in forming an impact and/or vibration absorbent material of the present invention may exhibit an adhesion to the glove body 55 that is sufficient to render further means of retainment unnecessary. It is possible to locate an insert interior to the glove body 55, in a pocket(s) within the glove body, in between layers of the glove body, or exterior to the glove body.

In another embodiment, the insert(s) may be removably affixed to the glove 50, such as by snaps, hook and loop fasteners (e.g., Velcro®), or other similar fastening mechanisms. In yet another embodiment, the insert(s) may be installed into a pocket(s) resident on the interior of the glove body 55. The embodiment of the impact and/or vibration absorbent material depicted in FIG. 3 may be especially well-suited to use in this latter-described embodiment of a protective impact glove, as the stretchable fabric outer covering 45 thereof can facilitate installation of the insert(s) into the pocket(s) by preventing the insert material from sticking to the pocket material.

Figure 6:
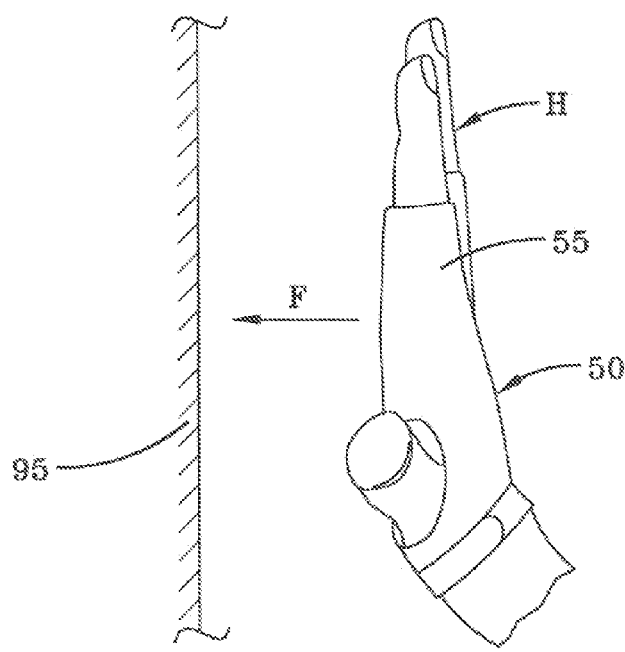
FIG. 6 shows the protective impact glove of FIG. 5 donned on a wearer's hand and being used in conjunction therewith to strike another object.
Figures 7A, 7B:
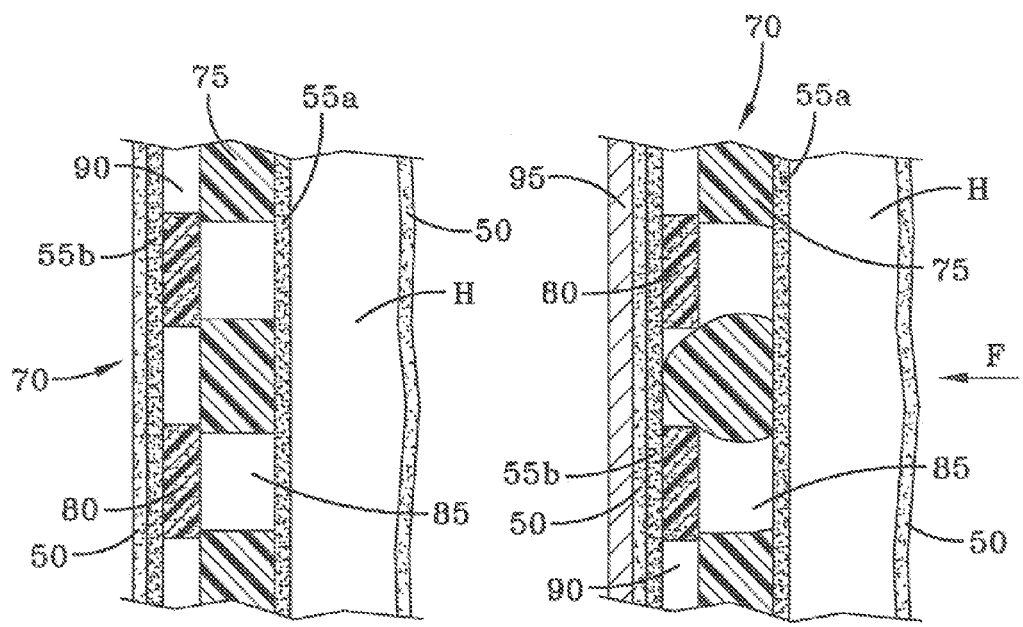
FIG. 7*a* is an enlarged view of a section of the protective impact glove of FIGS. 5-6, prior to being subjected to the impact force generated by striking the object shown in FIG. 6.
FIG. 7*b* depicts the section of the protective impact glove of FIG. 7*a* as it impacts the object shown in FIG. 6.
Figure 8:
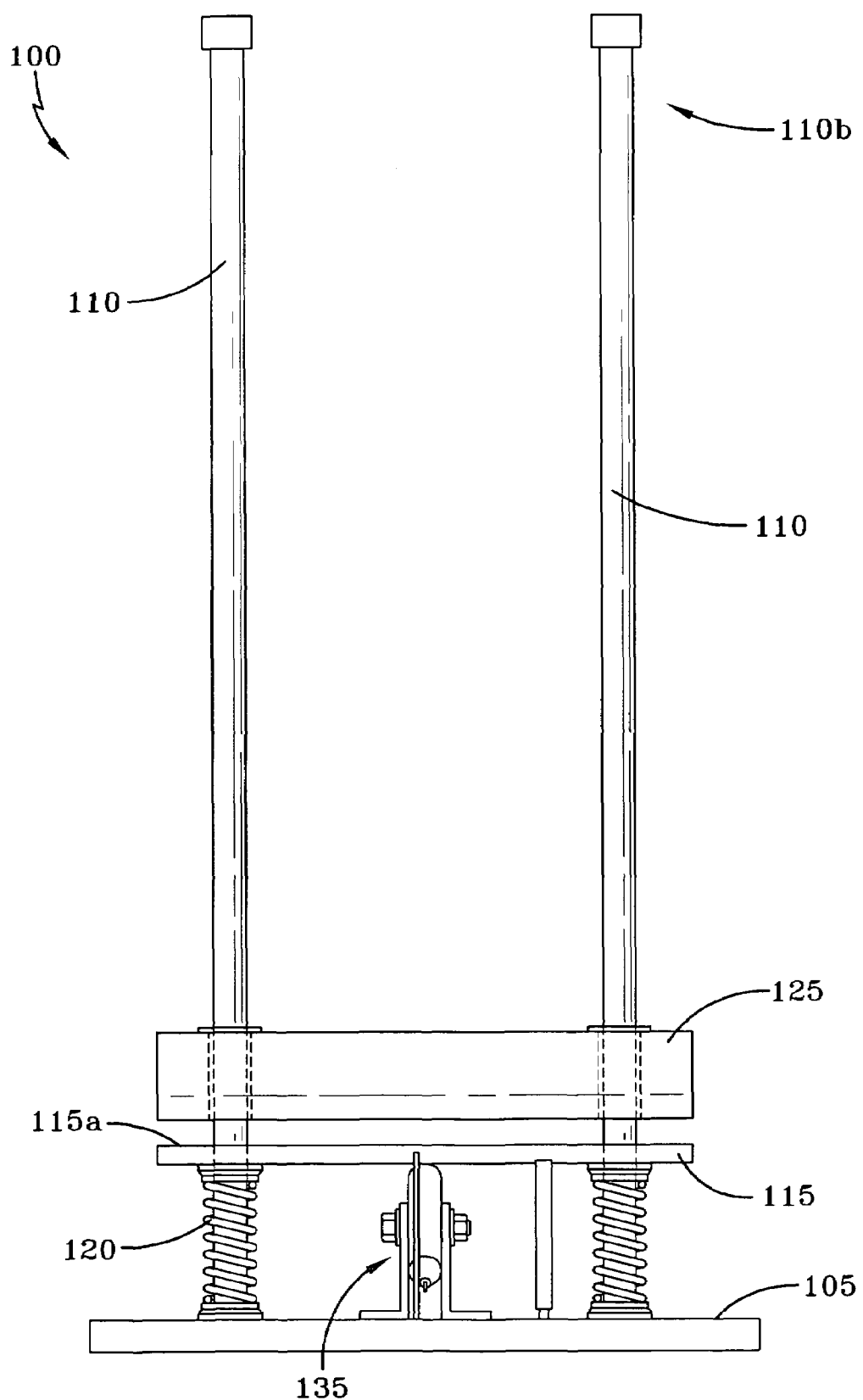
FIG. 8 is a front elevational view of a testing apparatus that is especially well-suited to determining the force absorption characteristics of an impact and/or vibration absorbent material of the present invention.
Figure 9:
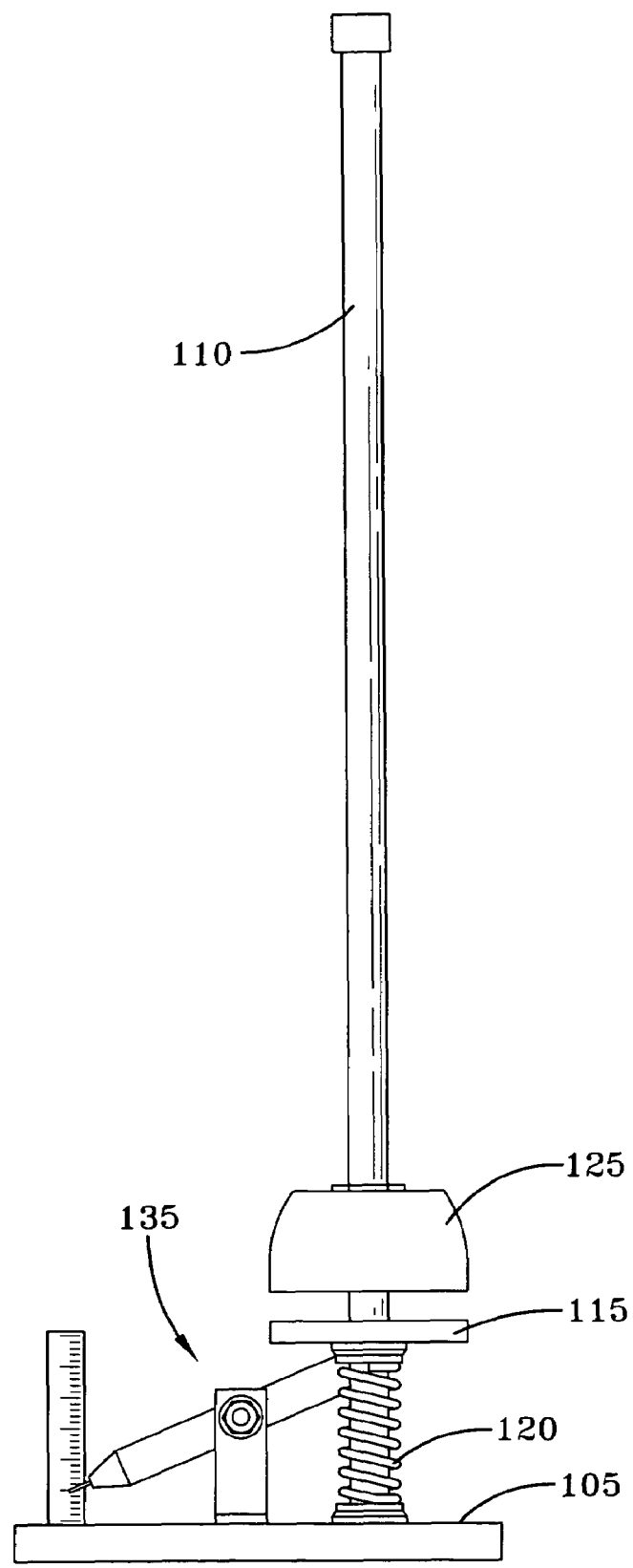
FIG. 9 is a side elevational view of the testing apparatus of FIG. 8.
Figure 10:
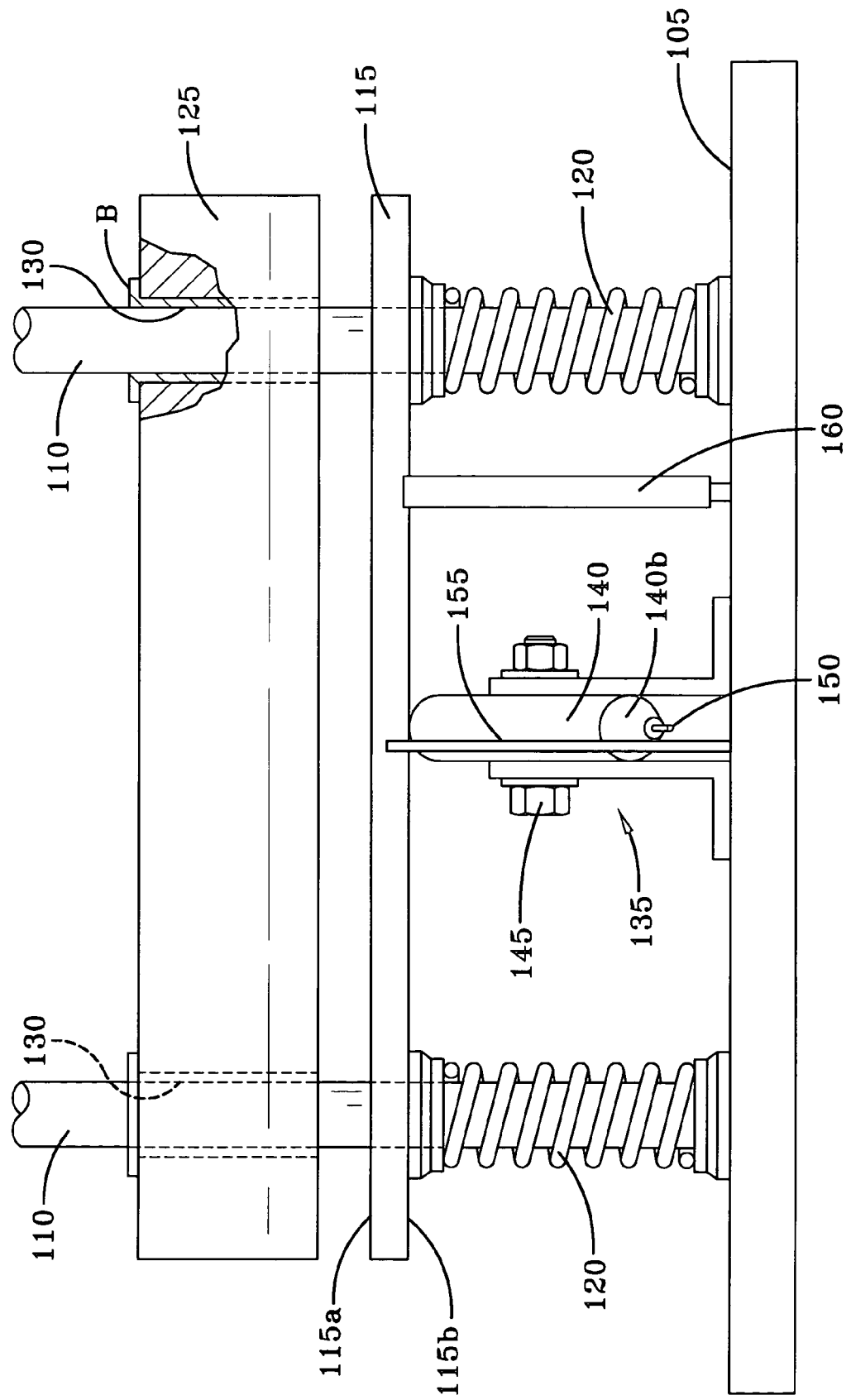
FIG. 10 is an enlarged front elevational view of a base portion of the testing apparatus.
Figure 11:
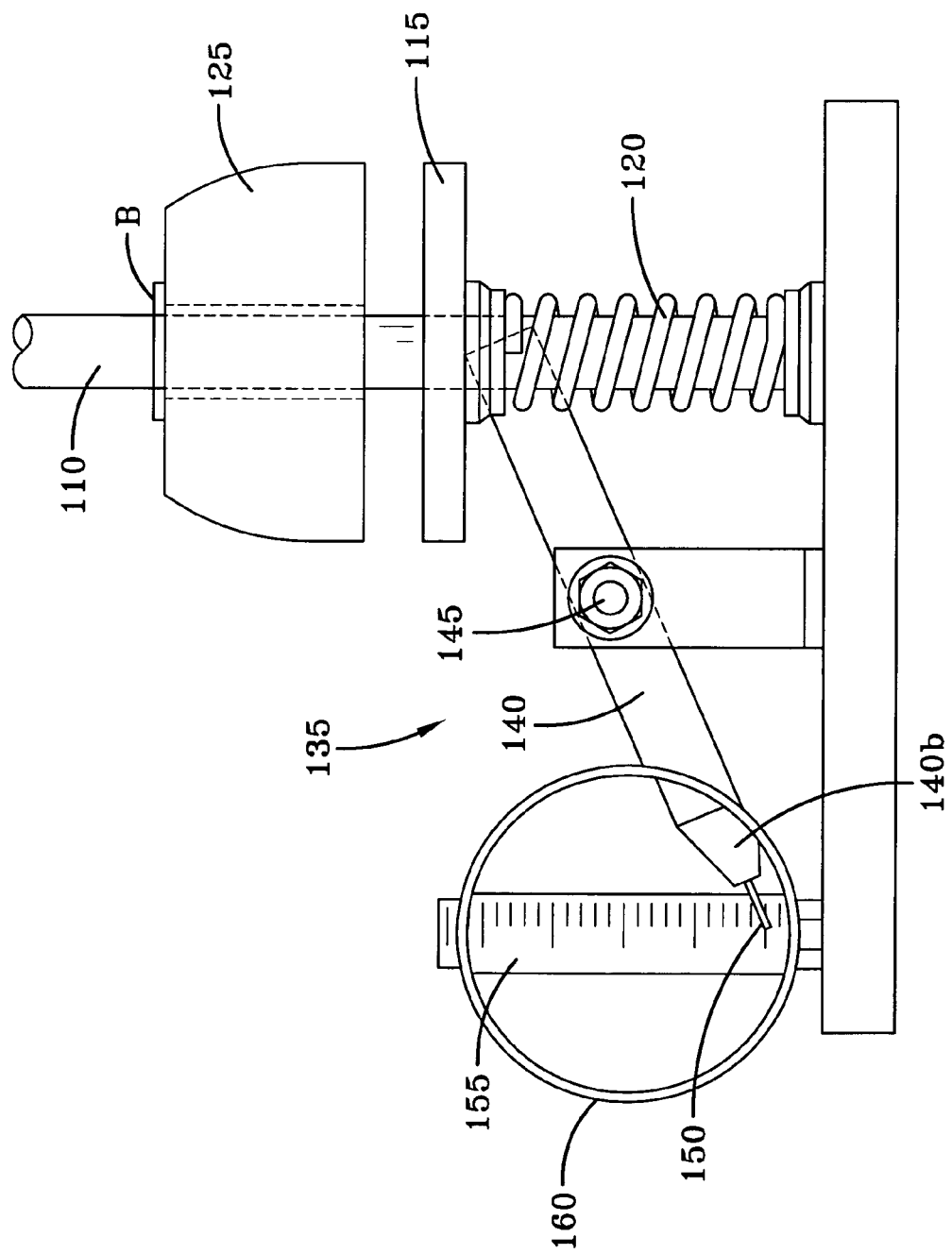
FIG. 11 is an enlarged side elevational view of a base portion of the testing apparatus.

A better understanding of the aforementioned impact force transfer ability of an impact and/or vibration absorbent material of the present invention can be gained through a review of FIGS. 6 and 7a-7b and the following description. FIG. 6 again illustrates the protective impact glove 50 of FIG. 5 on a wearer's hand H. In FIG. 6, however, the glove-covered hand H is shown to be in motion and at a point just prior to striking another object 95. The object 95 may be virtually any object such as, for example, an automotive assembly component.

As can be seen in FIG. 6, the glove-covered hand H is moving from right to left toward the object 95, and will deliver an impact force F to the object. As this process may be repeated a great number of times each day in a manufacturing setting, it is desirable not only to minimize exposure of the hand to impact forces, but also to transfer as much of the impact force as possible from the gloved hand H to the object 95. More specifically, while known protective gloves may provide a user's hand with at least some impact protection during such use, the cushioning materials present therein typically redirect the impact energy in a manner that results in far less impact force being delivered to an object than is actually generated by the hand. Consequently, if a given amount of force must be exerted against an object by the hand during performance of a particular process, the use of such known gloves results in the wearer having to increase the impact energy of the blow (generally by increasing hand speed). Obviously, this is counterproductive to minimizing the amount of impact force to which the hand is exposed.

Unlike these known materials, a glove 50 incorporating an impact and/or vibration absorbent material of the present invention is able to minimize the amount of impact and/or vibration force to which the hand is exposed, while simultaneously transferring a maximum amount of energy from the hand H to the object 95 being impacted thereby. FIG. 7a is an enlarged view of a small section of the impact and/or vibration absorbent material insert 60 of the glove 50 prior to impacting the object 95. As can be seen, the impact and/or vibration absorbent material 70 forming the insert 60 is again comprised of an inner layer 75 and an outer layer 85, with the layers having offset holes 85, 90. In this particular embodiment of the glove 50, the insert 60 resides in a pocket formed between inner and intermediary layers 55a, 55b of the glove body 55.

FIG. 7b illustrates the state of the impact and/or vibration absorbent material 70 of the insert 60 at, or just after, impact of the glove-covered hand H with the object 95. As can be seen, the impact F is primarily dissipated through (absorbed by) the inner layer 75 of the material 70 via a general deformation thereof and/or a deflection of portions thereof into holes 85 located therein. When an impact and/or vibration absorbent material is also used to form the outer layer 80, the outer layer may also contribute to impact and/or vibration absorption in a similar manner. It is this absorption/dissipation mechanism that generally redirects impact and/or vibration energy around or otherwise away from the hand.

The enhanced impact force transfer ability of the impact and/or vibration absorbent material 70 can also be observed in FIG. 7b. As shown in this example, when the glove covered hand H strikes the object 95, the inner layer 55a of the glove body 55 comes in contact therewith. The object 95 substantially halts the forward motion of the hand H. However, because of the flexible/deformable characteristics of the inner material layer 75, the energy associated with said forward motion and the impact force F generated when the hand H strikes the object 95 causes a further forward displacement of at least a portion of the inner material layer. The holes 90 in the outer layer 80 facilitate this forward displacement by receiving forward deflecting portions of the inner material layer 75. This forward deflection of the inner material layer 75 into the holes 85 in the outer material layer 80 at impact, acts to transfer a greater amount of impact force to the object 95 than can known impact and/or vibration absorbent materials. This forward force transfer is accomplished while simultaneously minimizing the amount of impact force actually transferred to the hand H. Upon dissipation of the impact force F, the inner material layer 75 withdraws from the holes 90 in the outer layer 85.

With respect to the exemplary representation of FIG. 7b, it should be noted that area over which the impact force deforms the material has been greatly reduced therein in order to better convey the operation mechanism of the material. More particularly, the impact force F has been shown to occur at substantially a single point when it would, in reality, be distributed over a much greater area. Consequently, the deformation of the material layer(s) 75, 85 would also occur over a much greater area—as would the forward deflection of the inner material layer 75 into the holes 90 in the outer layer 85. Also, as can be understood, both the general deformation of the material layer(s) 75, 85 and the amount of forward deflection of the inner material layer 75 into the holes 90 in the outer layer 85 will be related to the amount of impact force generated. It should also be realized that, although not shown in FIG. 7b for reasons of clarity, an impact force F of sufficient magnitude may cause a change in shape of the outer material layer 85, as well.

Any of the aforementioned materials may be manufactured by various methods. For example, an impact and/or vibration absorbent material of the present invention may be manufactured by a molding process, wherein the holes are created by the mold. The mold may also be designed to impart a particular shape or contour to the resulting impact and/or vibration absorbent material, such as might be desirable for use in the glove described above. Alternatively, a sheet of an impact and/or vibration absorbent material layer may be produced by any known means, whereafter the holes can be created by means of a punching or piercing process, for example. In this case, the impact and/or vibration absorbent material layer may already have a molded shape and/or contour, or a shape may be punched or stamped from the sheet of material. In yet another embodiment, holes may be drilled or otherwise bored into suitable material layers. While this method would likely be inefficient, it may allow for co-extrusion of impact and/or vibration absorbent materials of the present invention.

As can be understood from the foregoing, an impact and/or vibration absorbent material of the present invention can be useful in the manufacture of a variety of articles. An impact and/or vibration absorbent material of the present invention can be modified as described to produce the desired results associated with a particular application. An impact and/or vibration absorbent material of the present invention can be constructed from a variety of materials, which materials can be used in substantially any combination. An impact and/or vibration absorbent material of the present invention may be assembled from virtually any number of layers—depending on the application with which the material will be used. Consequently, the present invention is not to be considered limited to the various exemplary impact and/or vibration absorbent materials described above, or to a protective impact glove.

A testing apparatus 100 that is especially well-suited to determining the impact and/or vibration absorbing characteristics of a material of the present invention is illustrated in FIGS. 8-12. In most simplistic terms, it can be seen that the testing apparatus 100 comprises an impact imparting and measuring stand that is designed to deliver an impact force to a material of interest and to determine the amount of the impact force that is absorbed by the material.

The testing apparatus 100 includes a base 105, which may be weighted or otherwise of sufficient mass to maintain the apparatus in a stable position. A pair of guide rods 110 extend upwardly from the base 105. The guide rods 110 are preferably connected at or near their distal ends 110b to ensure a substantially parallel spacing therebetween.

A sample holding plate 115 resides at some distance above the base 105, with the guide rods 110 passing therethrough. The sample holding plate 115 is supported in this elevated position by a plurality of compression springs 120 of known spring rate that extend between the sample holding plate 115 and the base 105. In this particular embodiment of the testing apparatus 100, a compression spring 120 surrounds each of the guide rods 110 in the area between the base 105 and the sample holding plate 115—although such a construction is not essential to operation of the testing apparatus.

A weight 125 of predetermined and known mass is located to be substantially aligned and parallel to the top surface 115a of the sample holding plate 115. The guide rods 110 also pass through the weight 125, and the weight is adapted to slide along the guide rods. If desired, bushings B may be placed within guide rod receiving holes 130 in the weight 125 to facilitate its movement along the length of the guide rods 110.

Located on the base 105 and partially below the sample holding plate 115 is a force absorption indicator mechanism 135. The force absorption indicator mechanism 135 includes an indicator arm 140 mounted to the base 105 by a pivot connection 145. To the indicating end 140b of the indicator arm 140 may be mounted a pointer 150. The opposite end of the indicator arm 140 resides below the sample holding plate 115. The indicator arm 140 may be biased such that in a resting position, the non-indicating end thereof abuts the bottom surface 115b of the sample holding plate 115.

A scale 155 is mounted to the base and located such that the pointer 150 passes in front of the scale when the indicator arm 140 is pivoted. A magnifying glass 160 or similar view enlarging device may also be affixed to the base and located such that movement of the pointer 150 in front of the scale 155 may be better observed therethrough.

In operation, the weight 125 is raised to some predetermined position (height) above the sample holding plate 115. A retaining device may be provided to maintain the weight 125 in the raised position until its release is desired. Once the weight 125 has been raised, a sample of material (not shown) is placed on the sample holding plate 115. With the sample in proper position, the weight 125 is released from its raised position, whereafter it is allowed to fall freely downward along the guide rods 110 and to directly impact the sample of material residing on the sample holding plate 115.

Because the mass of the weight 125, the distance from which the weight falls, and the total spring rate is known, the force absorption properties of a material of interest can be determined. More specifically, when the weight 125 impacts the sample of material, any force passing therethrough also impacts the sample holding plate 115. This impact will cause a compression of the springs 120 and some downward movement of the sample holding plate 115. The downward movement of the sample holding plate 115 causes the indicator arm 140 to pivot about the pivot connection 145, thereby moving the pointer 150 upward away from the base 105. The height to which the pointer 150 rises can be measured by observing the scale 155—preferably through the magnifying glass 160.

As both the total spring rate and the impact force imparted by the weight 225 are known, a given deflection of the sample holding plate 115 can be correlated to a total amount of pass-through impact force. For example, in the particular embodiment of the apparatus shown in FIGS. 8-11, the total spring rate is 688 lb/in. Consequently, each 1/32 inch deflection of the sample holding plate is equivalent to a pass-through impact force of approximately 21.5 lb. (i.e., 0.03125 in.×688 lb/in.) Because the deflection of the sample holding plate 115 will result in an equivalent rise of the pointer 150, the total amount of force passed through the sample of material can be measured by observing the rise of the pointer 150 in front of the scale 155 and multiplying the rise distance by the total spring rate. For example, using the exemplary spring rate of 688 lb/in., a 0.25 in. observable rise of the pointer 150 corresponds to a pass-through impact force of approximately 172 lb.

The amount of impact force absorbed by a particular material sample can then be determined by subtracting the observed/calculated pass-through impact force from the known impact force imparted by the weight 125. The difference between these values will be the amount of impact force absorbed by the sample of material.

The embodiments of the present invention described in detail above have been provided for the purpose of illustration only. However, nothing in the foregoing description is meant to limit the scope of the invention to the particular embodiments described and/or shown. For example, it would be understood by one skilled in the art that various other materials may be acceptably substituted for the exemplary materials described herein. It would be understood by one skilled in the art that an impact and/or vibration absorbent material of the present invention can be used in articles other than a glove, insole and seat cushion. Consequently, while exemplary embodiments of the present invention have been shown and described, the scope of the invention is not to be considered limited by such disclosure, and modifications are possible without departing from the spirit of the invention as evidenced by the following claims:

What is claimed is:

1. An impact and/or vibration absorbent material comprising:
   a first impact and/or vibration absorbent material layer constructed from a flexible polymeric material, said first material layer including a plurality of holes therein;
   a second impact and/or vibration absorbent material layer constructed from a polymeric material having a hardness greater than the hardness of said first material layer, said second material layer including a plurality of holes therein;
   wherein said holes in said first material layer are located to be offset from said holes in said second material layer when said layers are properly assembled to one another; and
   wherein portions of said first material layer deflect into said holes in said second material layer when said impact and/or vibration absorbent material is subjected to an impact force.

2. The impact and/or vibration absorbent material of claim 1, wherein said holes in said first material layer are located to be substantially equidistant from neighboring holes in said second material layer when said layers are properly assembled to one another.

3. The impact and/or vibration absorbent material of claim 1, wherein said holes in each material layer pass fully therethrough.

4. The impact and/or vibration absorbent material of claim 1, wherein said holes are distributed substantially uniformly throughout each material layer.

5. The impact and/or vibration absorbent material of claim 1, wherein said holes are distributed with varying density throughout said material layers in order to provide said impact and/or vibration absorbent material with areas of dissimilar impact and/or vibration absorbing characteristics.

6. The impact and/or vibration absorbent material of claim 1, wherein an exposed major surface of at least one impact and/or vibration absorbent material layer is covered by a stretchable fabric.

7. The impact and/or vibration absorbent material of claim 1, wherein said holes also pass through said fabric.

8. The impact and/or vibration absorbent material of claim 1, wherein said inner material layer is comprised of an elastomer or a thermoplastic elastomer.

9. The impact and/or vibration absorbent material of claim 8, wherein said inner material layer is comprised of a polymeric gel.

10. The impact and/or vibration absorbent material of claim 1, wherein said outer material layer is selected from the group consisting of an elastomer, thermoplastic elastomer, rigid or semi-rigid thermoplastic, and natural rubber.

11. The impact and/or vibration absorbent material of claim 10, wherein said outer material layer is comprised of a closed-cell foam.

12. The impact and/or vibration absorbent material of claim 10, wherein an exposed major surface of at least one of said inner and outer material layers is covered by a stretchable fabric.

13. The impact and/or vibration absorbent material of claim 12, wherein said holes also pass through said fabric.

14. An impact and/or vibration absorbent material comprising:
   an inner impact and/or vibration absorbent material layer constructed from a polymeric gel material, said inner material layer including a plurality of holes therethrough; and
   an outer impact and/or vibration absorbent material layer constructed from a closed-cell foam material, said outer material layer including a plurality of holes therethrough and having a hardness greater than the hardness of said inner material layer;
   wherein said holes in said inner layer are located to be offset from said holes in said outer layer when said layers are properly assembled to one another;
   wherein said holes contribute to the impact and/or vibration absorption abilities of said material by allowing portions of said material to deflect thereinto when subjected to an impact and/or vibration force; and
   wherein portions of said inner material layer deflect into said holes in said second material layer when said impact and/or vibration absorbent material is subjected to an impact force, thereby enhancing the amount of said impact force transferred to an impacted object.

15. The impact and/or vibration absorbent material of claim 14, wherein said holes in said inner material layer are located to be substantially equidistant from neighboring holes in said outer material layer when said layers are properly assembled to one another.

16. The impact and/or vibration absorbent material of claim 14, wherein said holes are distributed substantially uniformly throughout each material layer.

17. The impact and/or vibration absorbent material of claim 14, wherein said holes are distributed with varying density throughout said material layers in order to provide said impact and/or vibration absorbent material with areas of dissimilar impact and/or vibration absorbing characteristics.

18. An impact and/or vibration protective glove comprising:
   a glove body; and
   at least one impact and/or vibration absorbent material component for inclusion in or on said glove body, said impact and/or vibration absorbent material component comprising:
      an inner layer of a flexible polymeric material, said inner layer including a plurality of holes therethrough, and
      an outer layer of a closed-cell foam material, said outer layer including a plurality of holes therethrough,
      wherein said holes in said inner layer are located to be offset from said holes in said outer layer when said layers are properly assembled to one another,
   wherein said at least one impact and/or vibration absorbent material component is located in or on said glove body so as to absorb impact and/or vibration forces to which a wearer's hand will be exposed when wearing said impact and/or vibration protective glove; and
   wherein portions of said inner layer of material deflect into said holes in said outer layer of material of said at least one impact and/or vibration absorbent material component when said impact and/or vibration protective glove strikes an object, thereby enhancing the amount of impact force transferred to said object.

19. The impact and/or vibration protective glove of claim 18, wherein said glove body is constructed from a material selected from the group consisting of leather, vinyl, fabric, composite, and elastomer.

20. The impact and/or vibration protective glove of claim 18, wherein said at least one impact and/or vibration absorbent material component is located along an interior portion of said glove body.

21. The impact and/or vibration protective glove of claim 18, wherein said at least one impact and/or vibration absorbent material component is located between an inner and outer layer of said glove body.

22. The impact and/or vibration protective glove of claim 18, wherein said at least one impact and/or vibration absorbent material component is located in at least one receiving pocket in or on said glove body.

23. The impact and/or vibration protective glove of claim 18, wherein said at least one impact and/or vibration absorbent material component is located on an exterior portion of said glove body.

24. The impact and/or vibration protective glove of claim 18, wherein said at least one impact and/or vibration absorbent material component is substantially covered with a stretchable fabric material to facilitate installation thereof to said glove body.

25. The impact and/or vibration protective glove of claim 18, wherein said at least one impact and/or vibration absorbent material component is removably affixed to said glove body.

26. The impact and/or vibration protective glove of claim 18, wherein at least one impact and/or vibration absorbent material component is permanently affixed to said glove body.

27. The impact and/or vibration protective glove of claim 18, wherein said at least one impact and/or vibration absorbent material component is provided with a non-uniform pattern of holes so as to selectively impart dissimilar impact and/or vibration absorbing characteristics to particular areas thereof.

28. The impact and/or vibration protective glove of claim 18, wherein multiple impact and/or vibration absorbent material components are provided for installation to a single glove.

29. The impact and/or vibration protective glove of claim 18, wherein said flexible polymeric material is a polymeric gel.

* * * * *